US005841560A

United States Patent [19]
Prucnal

[11] Patent Number: 5,841,560
[45] Date of Patent: Nov. 24, 1998

[54] SYSTEM FOR OPTICAL PULSE TRAIN COMPRESSION AND PACKET GENERATION

[75] Inventor: Paul R. Prucnal, Princeton, N.J.

[73] Assignee: The Trustees of Princeton University, Princeton, N.J.

[21] Appl. No.: 721,762

[22] Filed: Sep. 30, 1996

[51] Int. Cl.$^6$ ................................................ H04J 14/08
[52] U.S. Cl. ......................... 359/138; 359/139; 359/140
[58] Field of Search ................................... 359/138, 139, 359/140, 135

[56] References Cited

U.S. PATENT DOCUMENTS

| | | | |
|---|---|---|---|
| 5,099,471 | 3/1992 | Tsukada et al. | 359/135 |
| 5,121,240 | 6/1992 | Acampora | 359/138 |
| 5,450,225 | 9/1995 | Bostica et al. | 359/139 |
| 5,574,586 | 11/1996 | Chu et al. | 359/139 |

OTHER PUBLICATIONS

Electronics Letters, Nov. 6, 1986, vol. 22, No. 23, pp. 1218–1219, "TDMA Fibre–Optic Network with Optical Processing".
IEEE Photonics Technology Letters, Aug. 1993, vol. 5, No. 8, pp. 905–907, Yin–Chen Lu et al., "A Directly Modulated Pulse–Compressed and Time–Multiplexed Optical Source for High–Speed Multiple–Access Networks".
Journal of Lightwave Technology, Feb. 1992, vol. 10, No. 2, pp. 265–272, Yoshihiro Shimazu et al., "Ultrafast Photonic ATM Switch with Optical Output Buffers".

*Primary Examiner*—Edward Lefkowitz
*Attorney, Agent, or Firm*—Ohlandt, Greeley, Ruggiero & Perle

[57] ABSTRACT

An optical data compressor includes a sequence of N compression stages for compressing a pulse train having a repetition time T and a repetition rate f to a pulse train having a repetition time t, where t is much less than T. Each compression stage includes a first optical path with a first gate and a delay element exhibiting a time delay (T−t)j, where j is a sequence number of the respective compression stage. The optical data compressor further includes: a second optical path with a second gate; a first coupler for inducing the pulse train onto the first and second optical paths; and a gating signal generator that is synchronized with the pulse train. The gating signal generator applies gating/non-gating signals, at a repetition rate of $f/2^j$, to the first gate and complementary non-gating/gating signals having a repetition rate of $f/2^j$ to the second gate. A second coupler combines outputs from the first and second optical paths and applies the combined optical output to a next in the sequence the N compression stages, if any.

6 Claims, 2 Drawing Sheets

5,841,560

SYSTEM FOR OPTICAL PULSE TRAIN COMPRESSION AND PACKET GENERATION

The invention described and claimed herein was made with partial support from the US Government under ARPA Contract F19628-94-C-0045.

FIELD OF THE INVENTION

This invention relates to a packet compression system and method and, more particularly, to a system for converting an optical pulse train into a compressed data packet.

BACKGROUND OF THE INVENTION

Optical fibers have made it feasible to transmit data at rates above 100 Gigabits per second, over a single fiber, in point-to-point communication as well as in networks. In future broadband integrated networks, each node will generate data at more than one Gbits/sec. The asynchronous transfer mode (ATM) has been proposed as an efficient packet-switching technique for the broadband integrated services digital network. In the ATM, multiplexing is performed statistically at the cell level. It uses fixed-size 53-byte packets, in which each packet is composed of a 5-byte header, followed by a 48 bit payload.

In an optical time-division multiplexing system, the conversion of electronic data to an optical format is often performed by an electro-optic modulator. An electro-optic modulator is a high speed on-off switch that is driven by the incoming electronic data, the effect being to control the amplitude of outgoing optical pulses. To achieve high aggregate network throughput, a very high speed laser, producing short pulses, is required as the source of optical pulses for the electro-optic modulator. Lasers operating at such high pulse repetition rates are difficult to achieve and have become a limiting factor. Consequently, there is often a significant mismatch in speed between incoming electronic data packets (for example, 155 Megabits per second or 622 Megabits per second in a commercial ATM switch) and the outgoing optical pulses (greater than 100 Gbits/sec.) that are to be sent through an optical fiber.

Because of the speed limits in electronic devices, direct modulation of non-return-to-zero electronic signals into return-to-zero optical pulses may not be possible over a few Gbits/sec., with current technology. As an alternative, efforts have been made to interleave the optical pulses at the bit or packet level. Lu et al. in "A Directly Modulated Pulse-Compressed and Time-Multiplexed Optical Source for High-Speed Multiple Access Networks," IEEE Photon Technology Letters, Volume 10, pages 905–907 (1993), propose a compact multiplexing scheme in which individually modulated optical pulses are time compressed, time delayed and interleaved to form a high-speed data stream. The Lu et al. procedure requires redundant hardware to produce the high-speed data stream and as the number nodes increases, the complexity of the system increases significantly.

Accordingly, it is an object of this invention to provide a system for packet-compression of a data-containing pulse train into optical packets.

It is another object of this invention to provide a pulse-train compression system and method which enables a signal train of data pulses propagating at electronic speed to be transmitted at data rates in excess of 100 Gbits/sec.

SUMMARY OF THE INVENTION

An optical data compressor includes a sequence of N compression stages for compressing a pulse train having a repetition time T and a repetition rate f to a pulse train having a repetition time t, where t is much less than T. Each compression stage includes a first optical path with a first gate and a delay element exhibiting a time delay $(T-t)j$, where j is a sequence number of the respective compression stage. The optical data compressor further includes: a second optical path with a second gate; a first coupler for inducing the pulse train onto the first and second optical paths; and a gating signal generator that is synchronized with the pulse train. The gating signal generator applies gating/non-gating signals, at a repetition rate of $f/2^j$, to the first gate and complementary non-gating/gating signals having a repetition rate of $f/2^j$ to the second gate. A second coupler combines outputs from the first and second optical paths and applies the combined optical output to a next in the sequence the N compression stages, if any.

DETAILED DESCRIPTION OF THE INVENTION

Figure 1:
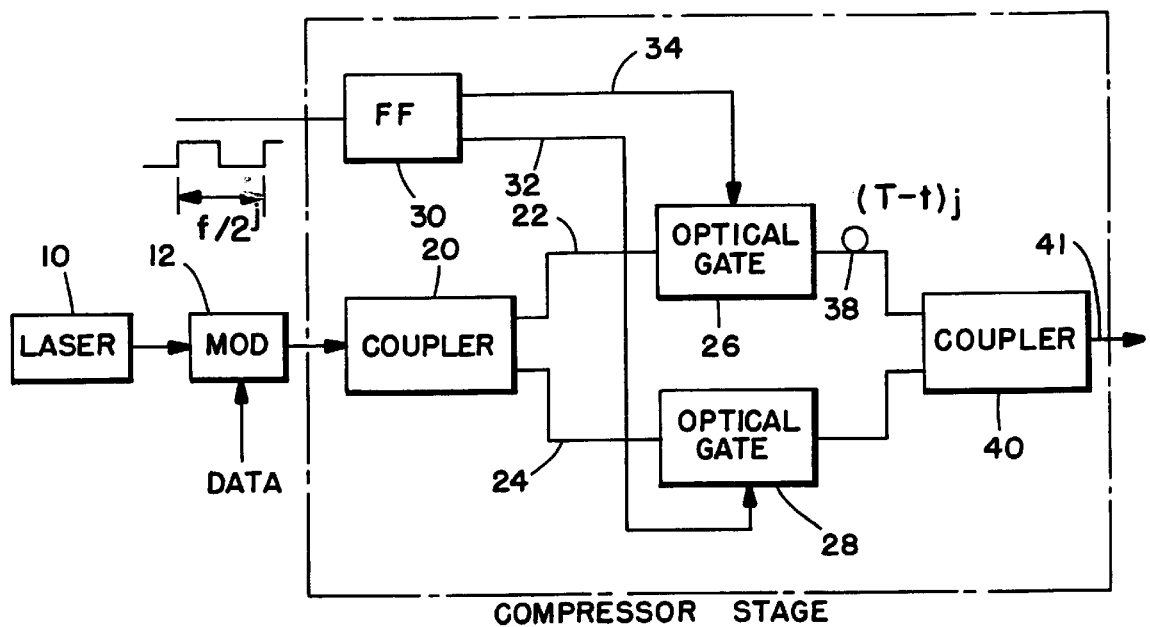
FIG. 1 is a block diagram of a representative stage of an optical data compressor incorporating the invention hereof.

Referring to FIG. 1, a mode-locked laser 10 supplies pulses every T seconds where $T=1/f$, and f is the optical pulse-repetition rate. The pulse train output from laser 10 is applied to an electro-optic modulator 12 which is driven by a modulating electronic data pulse train, having the same pulse repetition rate as laser 10. The resulting output from electro-optic modulator 12 is an uncompressed packet which consists of M bits of information (e.g. usually 424 bits in the asynchronous transfer mode).

Figure 2:
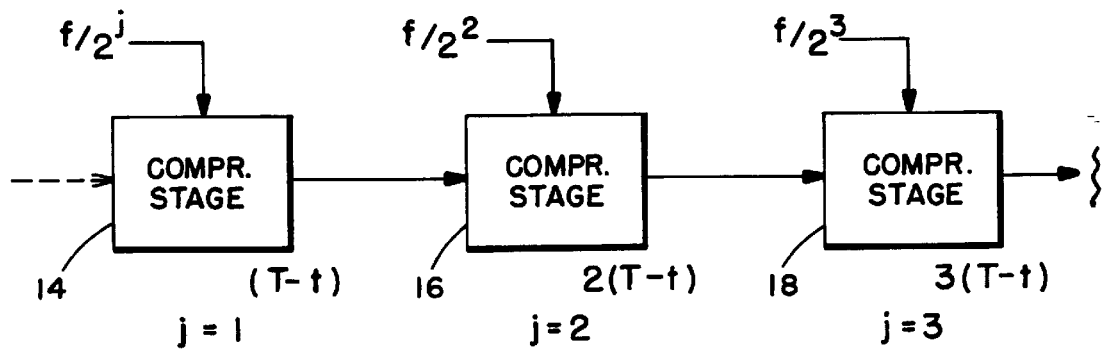
FIG. 2 illustrates a series of stages of the optical data compressor that incorporates the invention.

Packet compression is achieved by sending the modulated pulse train through a series of compression stages 14, 16, 18, etc., etc., (see FIG. 2). Only the first compressor stage receives an input from modulator 12. Each compressor stage includes an optical coupler 20 that includes a pair of outputs 22, 24 which feed optical gates 26 and 28, respectively. Each of optical gates 26 and 28 is an electro-optic modulator which can be driven between gating and blocking states by applied binary control signals.

A bistable flip-flop 30 outputs to optical gates 26 and 28 bilevel control signals which operate as the gating/non-gating signals. The binary control levels on output lines 32 and 34 are complementary so that when one optical gate is in the gating state, the other optical gate is in the blocking state, and vice versa.

The output of one of the optical gates feeds through a delay element 38 to the output a 3 db coupler 40. In this case, delay element 38 is coupled between optical gate 26 and coupler 40. The output of optical gate 28 feeds directly into coupler 40. The output of coupler 40 feeds to a next stage of the data compressor or acts as an output from the data compression system, as the case may be.

As can be seen from FIG. 2, the data compressor comprises a series of compressions stages 14, 16, 18, etc., with stage 14 being the first stage, stage 16 the second, stage 18 the third, etc. A clock signal frequency is fed to each stage to operate the resident flip-flop 30 that is present therein. The clock signal frequency applied to each stage can be defined as:

$$f(j) = f/2^j \quad (1)$$

where: j is the sequence number of respective compression stage.

Each stage includes a delay element 38 whose delay period can be expressed as:

$$2^{j-1}(T-t) \text{ seconds} \quad (2)$$

where: T=the time between succeeding pulses that are output from laser 10;

t=time between compressed data pulses in the output data packet;

j=sequence number of the jth stage.

Equation (1) indicates that the input clock signal frequency to flip-flop 30 in the first stage of the compressor (stage 14) is $f/2^1$ or f/2. Similarly, the input switching frequency to flip-flop 30 in the second compressor stage (stage 16) is $f/2^2$ or f/4. Similarly, the input switching frequency to the third stage (stage 18) is $f/2^3$ or f/8.

The delay period of delay element 38 also varies in each compressor stage in accordance with Equation (2). More specifically, the delay of delay element 38 in stage 1 is simply (T−t). In the second stage (stage 16) the delay of delay element 38 is 2(T−t) and the delay of delay element 38 in the third stage (stage 18) is 4(T−t).

The operation of the data compressor system shown in FIGS. 1 and 2 will now be described in conjunction with the waveforms of FIG. 3. As indicated above, the first stage of the compressor is fed with a clock signal frequency of f/2, where f is the repetition rate of the output pulses of laser 10. Thus, optical gate 26 is gated open for one/half a period and optical gate 28 is gated open for the other one-half of the period, causing alternate bits to emerge from upper and lower optical gate 26, 28, respectively. The two optical gates 26 and 28 do not overlap and evidence positive gain during the non-overlapping time intervals.

Figure 3:
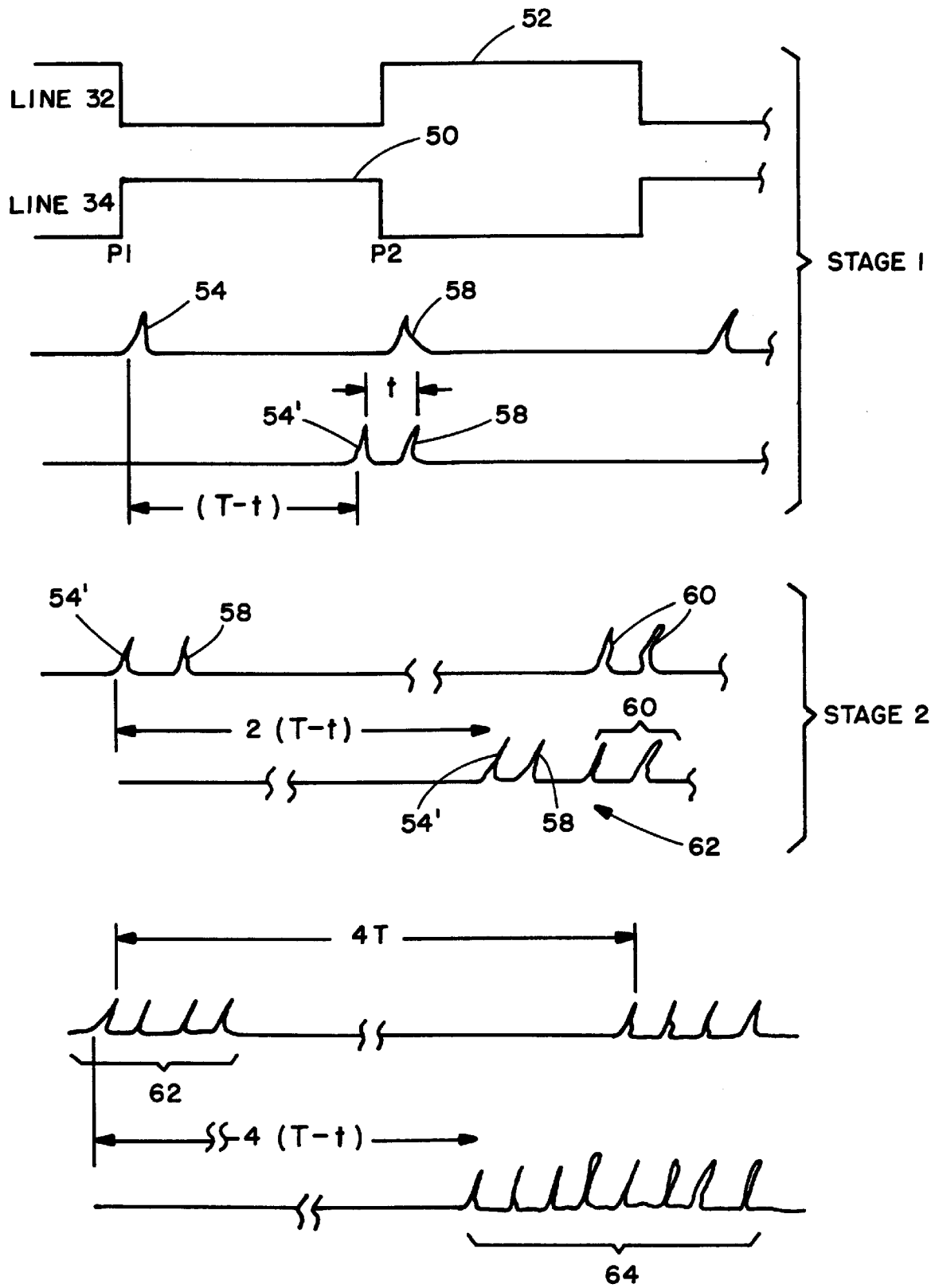
FIG. 3 is a waveform timing diagram helpful in understanding the operation of the data compressor of FIGS. 1 and 2.

Waveforms 50 and 52 in FIG. 3 illustrate the control levels that are applied to lines 32 and 34, respectively. Note that the high control level extending from p1 to p2 on line 34 enables the gating by optical gate 26 of optical pulse 54 to delay element 38, where it is delayed by a time (T−t) to a point indicated by 54'. The low control level impressed on line 32 from p1 to p2 closes optical gate 28. At p2, control level 50 traverses from a high to a low level and control level 52 traverses from a high level to a low level. In response, optical gate 26 is closed and optical gate 28 is opened, thereby enabling pulse 58 to pass, following pulse 54' by a time "It". Those pulses are output by coupler 40 onto line 41 and are fed to the second stage (stage 16) of the compressor.

Note that in the second stage, the input frequency to flip-flop 30 is now f/4, thereby halving the output frequency of control levels on lines 32 and 34. In a similar manner, the delay of delay element 38 is lengthened to 2(T−t). As a result, pulse pair 54', 58 that is fed to second compressor stage 16, is delayed by an amount 2(T−t) in delay element 38, whereas next pulse pair 60 (that are offset by a time duration of 2T) are not delayed, when gated through optical gate 28. As a result, pulse pair 54', 58, closely followed by pulse pair 60' that is delayed by a time t therefrom, are input into coupler 40 and are output on line 41 as shown at 62 in FIG. 3.

In the third stage of the compressor (stage 18), the frequency input to flip-flop 30 is reduced to $f/2^3$ or f/8. Similarly, the delay of delay element 38 is lengthened to 4(T−t). In a manner identical to that described above, a series of eight pulses 64' is developed and is output from the respective coupler 40, via line 41.

Considering a more concrete example, if the repetition rate f of the optical pulses is from laser 10 is f=1.25 GHz (T=800 ps), and the ATM data packets that are applied to modulator 12 are also at 1.25 Gbits/sec., compressing 424 bits in an ATM packet requires 9 stages. If the compressed bit separation is t=10 picoseconds (100 Gbits/sec.), the compression factor is 80.

The compression rate is limited only by the delay lines and the available pulse width from mode locked laser 10. The system is relatively insensitive to the switching speed of optical gates 26 and 28. It is important to note that the system of FIG. 1 and 2 requires no fast electronics: the first clock in the delay stage runs at half the electronic data rate and the clock frequency of each successive stage, decreases by a factor of two. Such decrease of clock frequency by halves can be accomplished simply through the use of a frequency divider or a counter. Since the switching speed of a typical semiconductor optical amplifier is approximately one GHz., the input data rate into the first stage (stage 14) should be slower than this rate.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. An optical compressor having a sequence N of compression stages, where N is an integer >1, for compressing a pulse train having a repetition time T and a repetition rate of f, to a pulse train with a repetition time t, where t<T, each compression stage comprising:

a first optical path including a first gate and a delay element having a time delay (T−t)j, where j is a sequence number of the respective compression stage;

a second optical path including a second gate;

first coupling means for inducing said pulse train onto said first optical path and second optical path;

gate control means, for applying gating/nongating signals having a repetition rate of $f/2^j$ to said first gate and complementary non-gating/gating signals having a repetition rate of $f/2^j$ to said second gate; and second coupling means for combining outputs from said first optical path and second optical path and applying a combined output therefrom to a next one of said sequence of N compression stages, if any.

2. The optical data compressor as recited in claim 1, wherein each said first gate and second gate is an electro-optic modulator.

3. The optical data compressor as recited in claim 1, wherein said gate control means is a binary flip-flop which, when outputting a gating signal to a gate enables said gate to pass an optical pulse, and when outputting a nongating signal to a gate enables said gate to block an optical pulse.

4. The optical data compressor as recited in claim 1 further comprising:

a mode locked laser for supplying a pulse every T seconds at a repetition rate of f; and an electro-optic modulator for modulating each said pulse in accord with an applied data signal, said pulse train being an output from said electro-optic modulator.

5. A method for compressing a pulse train having a repetition time T and a repetition rate of f, to a pulse train with a repetition time t, where t<<T, said method employing N compressor stages, each stage including (i) a first optical path with a first gate and a delay element having a time delay $(T-t)j$, where j is a sequence number of the respective compression stage, (ii) a second optical path including a second gate, and (iii) coupling means for combining outputs from said first optical path and second optical path and applying a combined output therefrom to a next one of said sequence of N compression stages, if any, said method comprising the steps of:

inducing said pulse train onto said first optical path and second optical path;

applying gating/non-gating signals having a repetition rate of $f/2^j$ to said first gate; and applying complementary non-gating/gating signals having a repetition rate of $f/2^j$ to said second gate.

6. The method as recited in claim 5, further including the steps of:

causing a mode locked laser to supply an optical pulse every T seconds at a repetition rate of f; and modulating each said pulse in accord with an applied data signal having a repetition rate of f to create said pulse train.

* * * * *